United States Patent [19]
Guthry

[11] 3,909,057
[45] Sept. 30, 1975

[54] COMBINATION CAMPER AND BOAT TRAILER MECHANISM

[76] Inventor: Joe M. Guthry, 9306 Bintliff, Houston, Tex. 77036

[22] Filed: Oct. 29, 1973

[21] Appl. No.: 410,820

[52] U.S. Cl. ............................. 296/23 B; 280/414 R
[51] Int. Cl.² ........................ B60P 3/10; B60P 3/34
[58] Field of Search .... 296/23 R, 23 A, 23 C, 23 B, 296/26, 27, 23 D, 23 G; 214/515; 280/414 R

[56] References Cited
UNITED STATES PATENTS

| | | | |
|---|---|---|---|
| 1,366,771 | 1/1921 | Devencenzi | 280/34 R |
| 2,193,352 | 3/1940 | Thomas | 296/23 R |
| 2,245,465 | 6/1941 | Cole | 296/23 R X |
| 2,821,428 | 1/1958 | Webster | 296/23 C X |
| 2,879,103 | 3/1959 | Hall | 296/23 C |
| 2,881,023 | 4/1959 | Gile et al. | 296/23 B |
| 3,198,571 | 8/1965 | Majeski | 296/26 |
| 3,279,636 | 10/1966 | Asman | 214/515 |
| 3,363,932 | 1/1968 | Mann | 296/26 X |
| 3,486,786 | 12/1969 | Howarth | 296/23 B |
| 3,584,753 | 6/1971 | Voeller | 296/23 B X |
| 3,677,600 | 7/1972 | Charron | 296/27 |
| 3,768,673 | 10/1973 | Nydam et al. | 214/515 X |
| 3,784,248 | 1/1974 | Neuman | 296/23 B |

Primary Examiner—Robert B. Reeves
Assistant Examiner—Charles A. Marmor
Attorney, Agent, or Firm—Arnold, White & Durkee

[57] ABSTRACT

A combination camper and boat trailer mechanism according to the present invention may comprise a boat supporting framework and a camper supporting framework that are relatively movable and are interconnected by apparatus for raising and lowering the camper framework relative to the boat supporting framework. A camper assembly, which may be of the collapsible type having a canvas or rigid collapsible upper portion, as desired, may be supported by the camper framework and may be habitable both in lowered and raised positions thereof. A boat may be supported by the boat supporting framework below the camper framework and may be forcibly launched and retrieved from the rear portion of the trailer mechanism. The rear portion of the boat supporting framework may extend rearwardly beyond the rear portion of the camper framework and camper assembly defining a load carrying platform for articles such as storage compartments, motorcycles and the like. The camper framework and camper assembly may be removed from the boat supporting framework of the trailer assembly simply by releasing the camper framework lift devices from the boat supporting framework and moving the camper framework laterally in guideways provided therefor to allow the boat supporting framework to be utilized exclusively of the camper framework and camper assembly.

17 Claims, 12 Drawing Figures

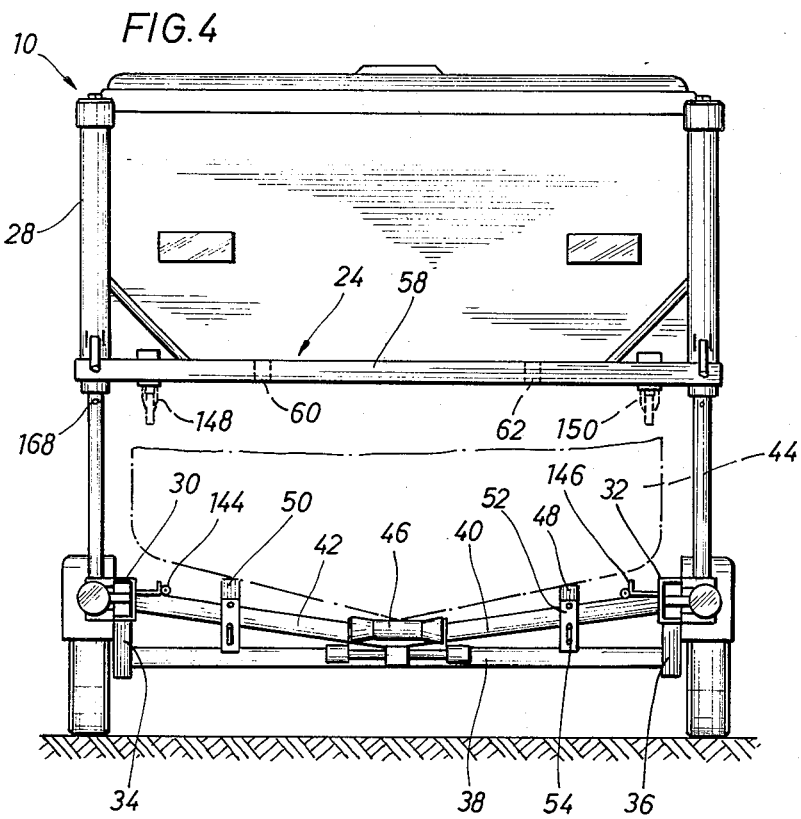
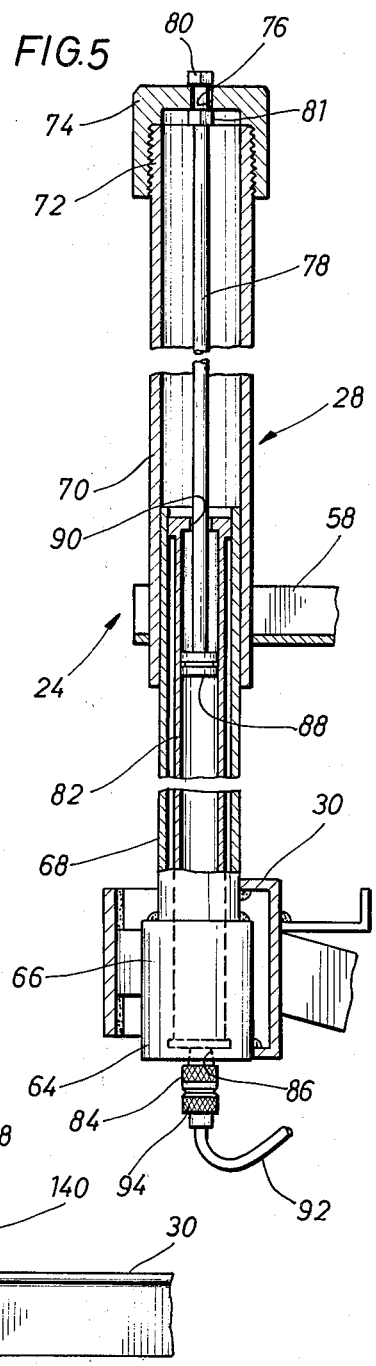
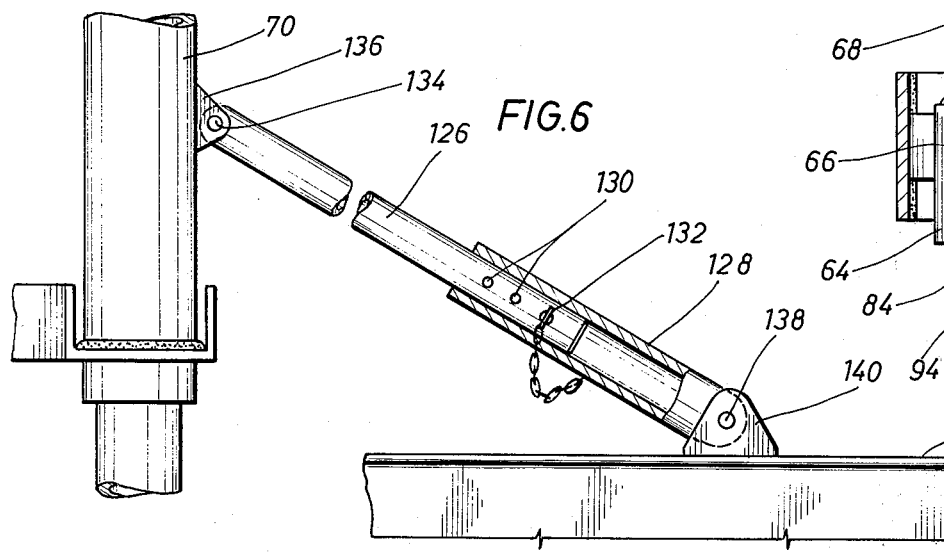
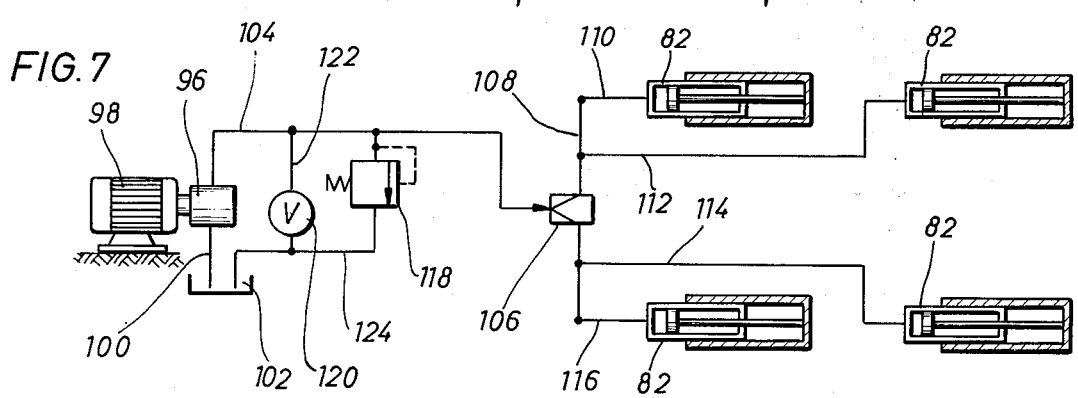

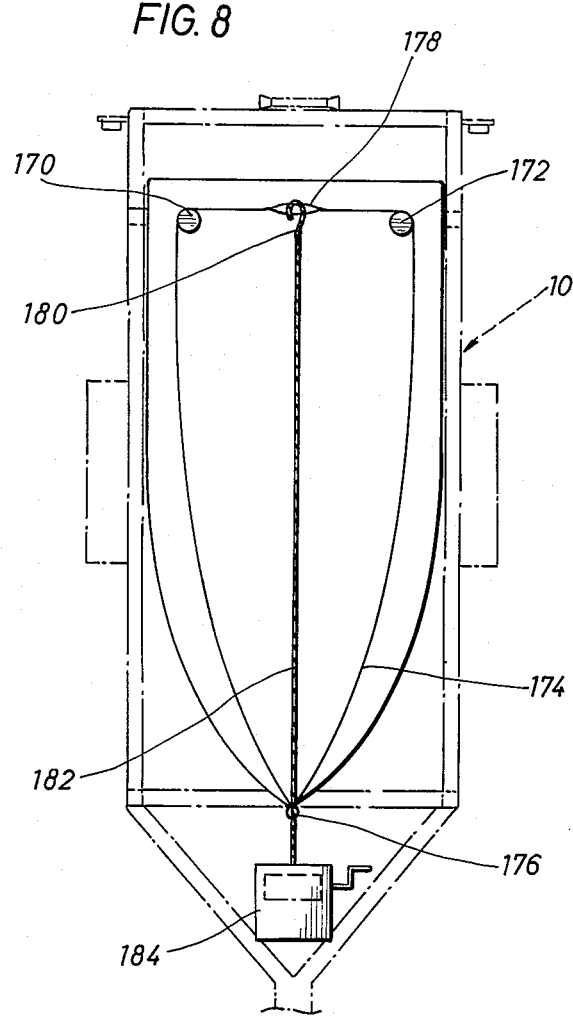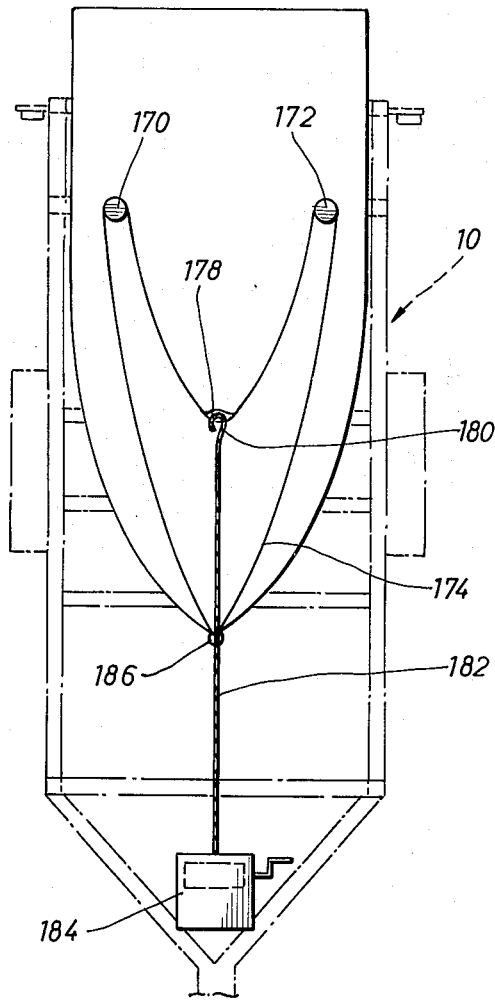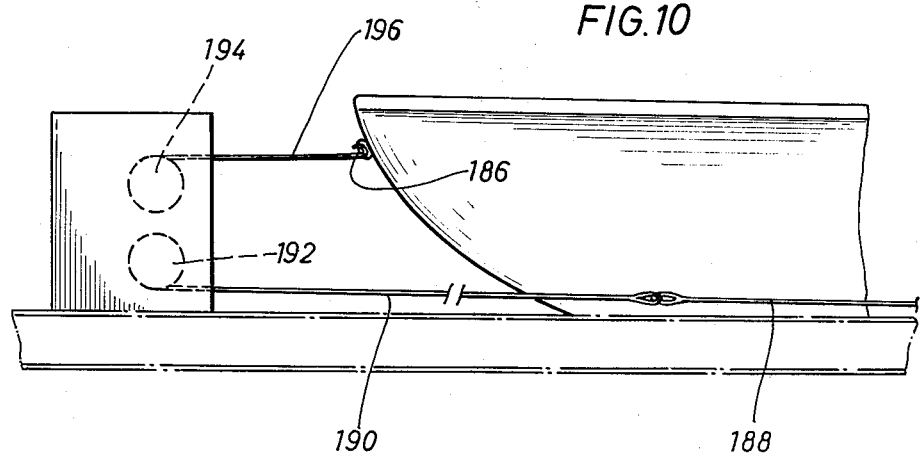

COMBINATION CAMPER AND BOAT TRAILER MECHANISM

FIELD OF THE INVENTION

This invention relates generally to boating and camping devices and more specifically relates to a trailer mechanism that is capable of simultaneously transporting a boat and a camper assembly, the camper assembly being habitable both when a boat is in position on the trailer mechanism and when the boat has been removed from the trailer.

BACKGROUND OF THE INVENTION

It is typical for camping areas in the United States and in other parts of the world to be located in the vicinity of bodies of water such as lakes, oceans, rivers, etc. It is also typical for persons enjoying camping to also enjoy boating and while boats are generally provided for rental in the vicinity of many camping areas, it is generally considered undesirable to rent boats for enjoyment of water sports.

Many persons enjoy combination boating and camping by providing for transportation of small boats such as canoes, light-weight aluminum boats and the like for their personal enjoyment when reaching camping areas that include water sports. The boats may be transported on special carriers that may be supported above automobiles, camper trailers and the like. There is no practical way, however, to transport a camper trailer and a boat and motor combination when the boat and motor are of heavy construction such as is necessary for water skiing and high speed boating.

In the past, camper devices have been provided that may also be utilized for transportation of boats, but such devices have rarely been produced commercially because of the difficulty of providing reasonable boat carrying capability and also providing a capability for efficient and enjoyable camping. For example, reference may be had to the U.S. patent to Gile et al., U.S. Pat No. 2,881,023, wherein a camping assembly is raised and lowered relative to a trailer and boat and rests upon the boat during roadway transportation. Green, U.S. Pat. No. 2,926,947, and Muse, U.S. Pat. No. 3,116,949, both teach transportation of boats within camper trailer assemblies. The patents to Kallies, U.S. Pat. No. 3,550,947, and Howarth, U.S. Pat. No. 3,486,786, teach transportation of a boat below a camper assembly, the camper assembly being telescopically lowered for the purpose of camping after the boat has been removed from the trailer assembly.

When a boat is launched from most boat trailers, it is typical for the rear end of the boat to descend into the water after the boat has partially cleared the trailer, thereby causing the front end of the boat to pivot upwardly relative to the trailer. In fact, a number of different types of boat trailers are manufactured that are provided with a pivotal or articulated framework in order that the boat may be effectively supported during pivoting thereof relative to the main portion of the trailer mechanism. It has not heretofore been considered practical to position camper systems above boats or to incorporate boats into camper systems if the boats are to be launched with a camper system in place primarily because the camper mechanism must be raised to a considerable height above the boat in order to allow normal pivoting of the boat relative to the trailer during launching. The height to which a camper mechanism must be raised to facilitate boat launching is generally considered excessive and, therefore, has effectively limited transportation of the camper assemblies above boats in combined boat and camper assemblies. For example, note the height to which the camper 50 of Gile et al. U.S. Pat. No. 2,881,023 must be raised in order to allow the boat to be launched.

Another problem that has severely limited the development of combined camper and boat trailer assemblies is the fact that the camper assembly frequently interferes with launching of the boat because of the mechanisms surrounding the boat as it is positioned on the trailer mechanism. It is desirable therefore to provide means for accomplishing forcible movement of the boat both onto and off of the trailer mechanism when launching and retrieving the boat.

It is also desirable that a camper assembly, disposed above a boat on a camper and boat trailer mechanism, be supported solely by the trailer mechanism and that it does not rest on or at any way interfere with the boat. The boat and/or the camper structure may be damaged due to vibration, shifting movement, etc. while the boat and camper assemblies are being transported by the trailer mechanism. The possibility of damage to either the camper or the boat during transportation, handling, boat launching, etc. has effectively limited commercial production of such devices.

It is desirable, in most road vehicles including camping equipment, that the center of gravity of camper trailer systems be as low as possible in order to prevent the possibility of the trailer mechanism overturning as sharp turns are made on roadways and to prevent sidewinds from interfering with transportation of the trailer vehicle. Positioning of a camper mechanism high enough above a boat on a trailer to facilitate normal loading and launching of the boat can place the center of gravity of the boat and camper trailer assembly sufficiently high that roadway handling of the same will be precarious and perhaps unsafe. Where boat and camper trailer assemblies are involved, it is desirable to provide means for maintaining the center of gravity of the camper and boat trailer mechanism as low as possible.

It is a primary object of the present invention therefore to provide a novel combination boat and camper trailer mechanism incorporating a camper assembly that may be raised and lowered relative to a boat and trailer assembly in order that the center of gravity of the combination may be maintained as low as possible during roadway towing operations and yet, the camper assembly may be adjusted as necessary to facilitate ease of loading and unloading of the boat and to facilitate optimum use of the camper assembly.

It is also an object of the present invention to provide a novel combination boat and camper trailer assembly wherein the camper mechanism is habitable in either the elevated or lowered positions thereof.

It is a further object of the present invention to provide a novel boat and camper trailer assembly wherein the position of the camper assembly may be positively locked relative to the boat and boat trailer framework to prevent inadvertent movement of the camper assembly during roadway transportation thereof.

It is another object of the present invention to provide a novel boat and camper trailer assembly incorporating an adjustable brace mechanism that effectively compensates for movement of the camper assembly relative to the boat and boat trailer assemblies and absorbs transverse thrust loads that may be applied to the elevated camper assembly during roadway transportation thereof.

Among the several objects of the present invention is contemplated the provision of a novel boat and camper assembly, wherein a boat may be conveniently launched into a body of water from the rear portion of the trailer assembly and the front portion or bow of the boat will not pivot upwardly during launching and retrieval of the boat.

It is also an important object of the present invention to provide a novel boat and camper trailer mechanism incorporating means for efficiently raising and lowering the camper relative to the boat trailer assembly and wherein such means may conveniently take the form of a hydraulic lift mechanism, a screw jack mechanism or any other suitable form of lift capable of safely elevating the camper assembly relative to the boat and trailer structures.

It is another object of the present invention to provide a novel boat and camper trailer mechanism including means for positively locking the lift mechanism to prevent the camper from falling if failure should occur in the trailer lift mechanism.

It is an even further object of the present invention to provide a novel boat and camper trailer assembly including a boat supporting framework that extends rearwardly beyond the camper assembly and provides a platform when a boat is not in place in the trailer mechanism, which platform may support articles such as motorcycles, a camping gear storage compartment, etc.

Another object of the present invention contemplates the provision of a novel boat and camper trailer mechanism including means for forcibly launching a boat from the trailer mechanism and forcibly retrieving the boat into receiving relationship with the trailer mechanism thereby preventing any necessity for the boat to be manipulated manually during launching and retrieving.

It is also an important object of the present invention to provide a novel boat and camper trailer assembly, wherein the center of gravity of the entire assembly is maintained sufficiently low to prevent difficult or unsafe roadway transportation of the boat and camper trailer assembly.

Other and further objects, advantages and features of the present invention will become apparent to one skilled in the art upon consideration of the entire disclosure hereof. The form of the invention, which will now be described in detail, illustrates the general principles of the invention, but it is to be understood that this detailed description is not to be taken as limiting the scope of the present invention.

SUMMARY OF THE INVENTION

The boat and camper trailer mechanism of the present invention may include a boat supporting framework having wheels connected thereto for transportation of the mechanism over roadways. A camper framework may be disposed in moveable relation to the boat supporting framework and may be moved vertically by a plurality of lift devices, which may take the form of linear hydraulic motors, mechanical jack mechanisms or any other suitable form of lift mechanism. A camper assembly may be supported by the camper framework and may be habitable both in the elevated and lowered positions thereof, thereby allowing the camper to be utilized when a boat is positioned on the trailer mechanism and when the boat has been removed therefrom. The lift mechanisms may conveniently take the form of linear hydraulic motors that may be simultaneously energized by a battery powered electric motor and pump mechanism that supplies hydraulic fluid under pressure to the fluid motors. The hydraulic system for energizing the linear motors may also include a "fail-safe mechanism" that prevents the camper assembly from falling in the event of failure of the hydraulic system. Lock devices may also be provided to positively secure the camper support framework and the camper assembly in elevated position exclusive of the lift system with which the boat and camper trailer assembly may be provided.

The boat supporting framework of the trailer mechanism may be positioned relative to the axles of the trailer wheel assemblies to such extent that the rear portion of the boat supporting framework may be positioned relative to the water upon launching and retrieval of the boat in such manner that the front or bow portion of the boat is effectively prevented from pivoting upwardly into an interfering relationship with the camper assembly, supported thereabove. The framework of the trailer mechanism may also include extensible means to serve as further guides for the boat during launching and retrieval operations to prevent the front portion of the boat from pivoting upwardly.

An extensible brace element may be interposed between the camper framework and the boat supporting framework and may absorb lateral thrust loads that may be applied to the camper framework during roadway transportation of the boat and camper trailer mechanism. The length of the brace may be adjusted as the camper and camper framework are raised and lowered relative to the trailer.

A double winch mechanism may be employed having one portion thereof operative during launching operations while the opposite portion thereof is utilized during boat retrieval operations and facilitating forcible launching and retrieval of the boat from the trailer mechanism.

The lift mechanism, operatively interposed between the boat supporting framework of the trailer and the camper framework, may be simply disconnected from the trailer framework and roller devices carried by the camper assembly may be received within guideways provided on the boat supporting framework, thereby allowing the camper assembly to be quickly and efficiently removed from the boat supporting framework in the event it is desired to utilize the boat and trailer alone. Quick acting connections may be provided in the hydraulic system to facilitate connection and disconnection of the hydraulic system of the lift mechanism when it is desired to remove or replace the trailer relative to the boat supporting framework.

Each of the linear fluid motors, that may serve as camper lift devices, may incorporate inner and outer telescoping tubular elements that may be structurally connected respectively to the boat supporting framework and to the camper framework. A piston and cylinder mechanism may be disposed within the inner tubular element and may include a piston shaft that may be received by the outer tubular element. Hydraulic energization of the piston and cylinder mechanism will cause telescoping movement of the inner and outer tubular elements and achieve raising or lowering of the camper and camper framework relative to the boat supporting framework.

BRIEF DESCRIPTION OF THE DRAWINGS

So that the manner in which the above recited features, advantages and objects of the present invention as well as others, which will become apparent, are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are, therefore, not to be considered limiting of its scope, for the invention may admit to other equally effective embodiments.

IN THE DRAWINGS

Figure 1:
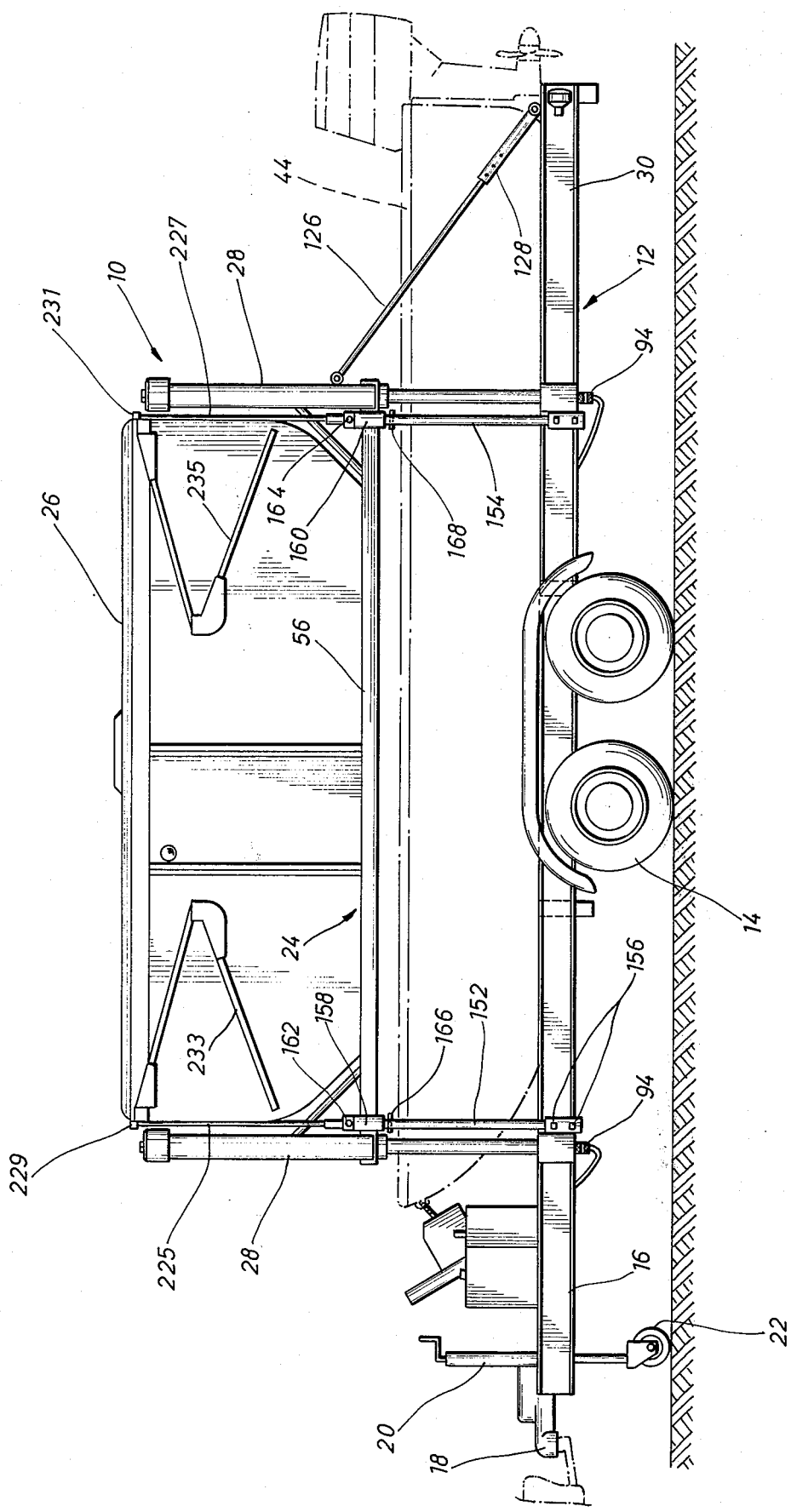

FIG. 1 is a side elevational view of a combination boat and camper trailer mechanism constructed in accordance with the present invention.

Figure 2:
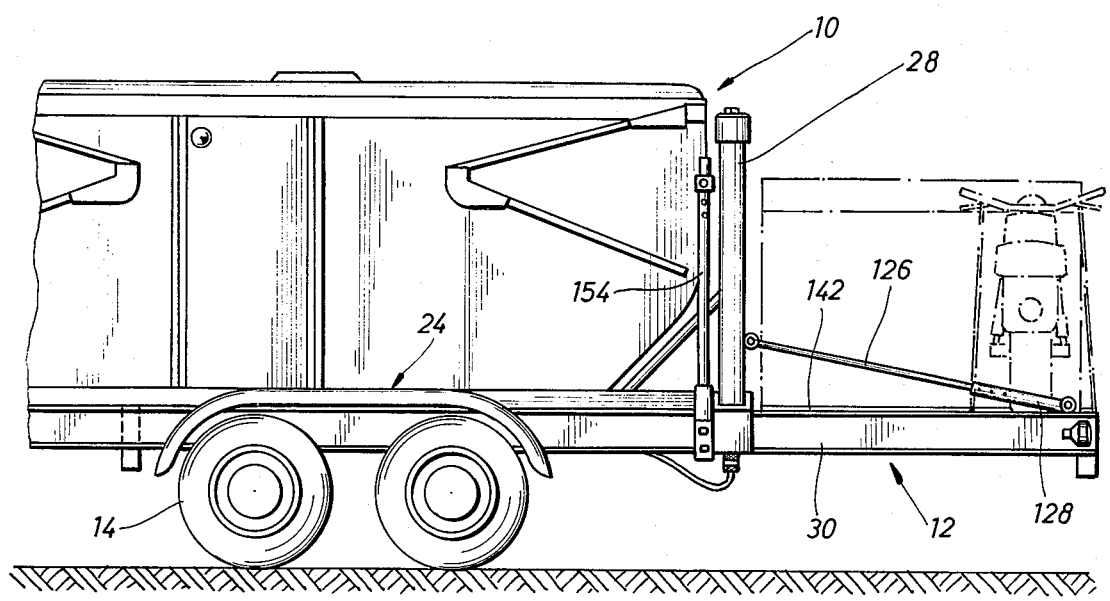

FIG. 2 is a partial side elevational view of the combination boat and camper trailer mechanism of FIG. 1 illustrated with the boat removed and the camper assembly lowered and resting upon the boat supporting framework of the trailer mechanism and further illustrating support of an article on a platform defined by the trailer framework rearwardly of the camper assembly.

Figure 3:
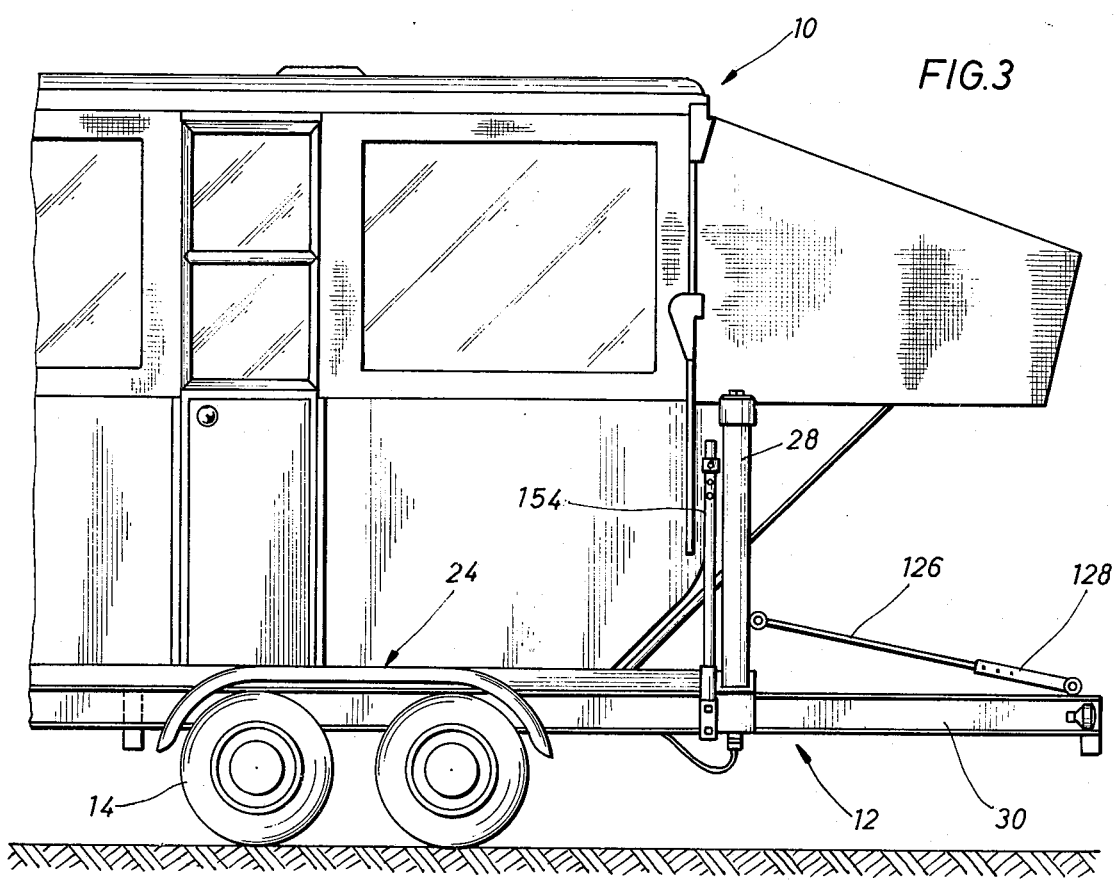

FIG. 3 is a partial side elevational view of the combination boat and camper trailer mechanism of FIGS. 1 and 2, illustrating the trailer mechanism with the lower portion thereof resting upon the boat supporting framework of the trailer and with the upper portion thereof being raised to the habitable level.

FIG. 4 is a rear end view of the combination boat and camper trailer assembly of FIGS. 1 and 2 showing the camper in its collapsed but elevated position and partially illustrating a boat in transporting position relative to a boat supporting framework portion of the trailer mechanism.

FIG. 5 is a sectional view of one of the hydraulic lift mechanisms with which the combination boat and camper trailer mechanism of the present invention may be provided.

FIG. 6 is a fragmentary elevational view, shown partially in section, illustrating an adjustable brace mechanism interposed between the boat supporting framework and a hydraulic lift portion of the camper framework, which brace mechanism will absorb thrust loads applied to the hydraulic lift mechanisms during roadway transportation of the boat and camper trailer assembly.

FIG. 7 is a schematic illustration of the hydraulic circuitry that may be provided for energization of the hydraulic lift mechanisms of the present invention.

FIG. 8 is a schematic illustration in plan view, showing a mechanical boat launching mechanism that may be energized by a motor driven winch system to eject the boat from the trailer mechanism during launching.

FIG. 9 is also a schematic illustration of the nature set forth in FIG. 8, showing the power boat launching mechanism in the operative or launching condition thereof.

FIG. 10 is a partial elevational view of the boat and boat trailer portions of the mechanism of this invention, illustrating a pair of superposed winch devices one of which is employed during launching of the boat from the trailer mechanism while the other is utilized for boat retrieval operations.

Figure 11:
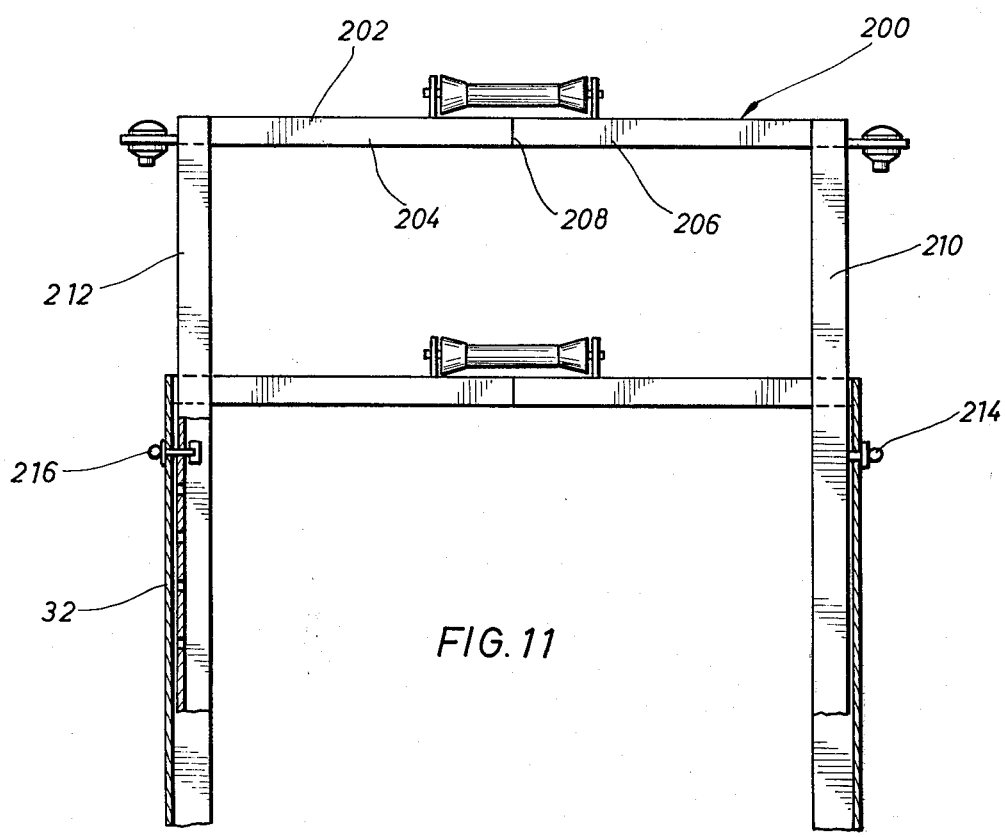

FIG. 11 is a partial elevational view of a boat and camper trailer mechanism such as depicted in FIGS. 1 and 2 hereof, illustrating a mechanical jack mechanism that may be employed for raising and lowering a camper and camper support framework relative to the boat supporting framework of a trailer mechanism.

Figure 12:
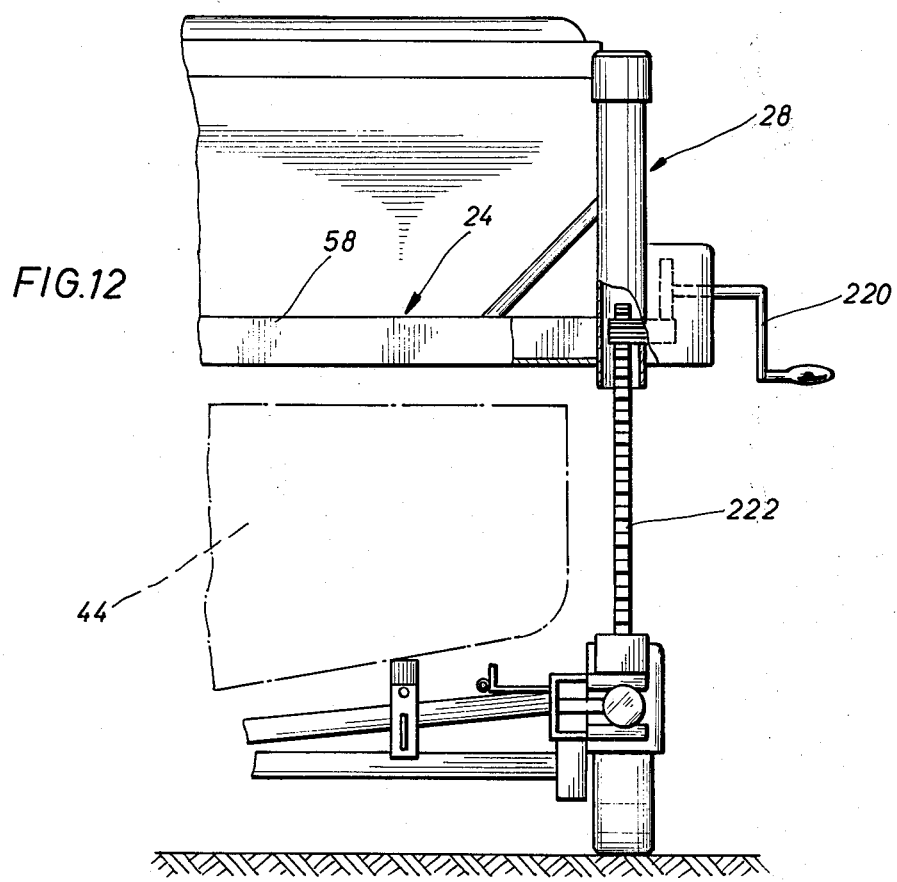

FIG. 12 is a partial elevational view depicting a modified embodiment of the present invention wherein mechanical jack mechanisms are employed to raise and lower the camper assembly and camper framework relative to the boat supporting framework.

DESCRIPTION OF PREFERRED EMBODIMENT

Referring now to the drawings and first to FIG. 1 there is depicted a combination boat and camper trailer mechanism generally at 10, that comprises a boat supporting framework, generally at 12, having wheel assemblies 14 providing for towing of the trailer mechanism over roadways. A tongue structure 16 and hitch device 18 may be provided on the trailer mechanism to facilitate connection thereof to a towing vehicle. Elevation of the hitch portion 18 of the trailer mechanism may be accomplished by means of a mechanical jack 20 having a small wheel 22, disposed at the lower extremity thereof, to facilitate movement of the tongue portion of the trailer for alignment of the hitch 18 with the trailer hitch structure of the towing vehicle.

A camper support framework, illustrated generally at 24, may support a camper assembly 26 and the camper framework and the camper assembly may be raised and lowered relative to the boat supporting framework 12 by means of a plurality of lift devices 28, one of the lift devices being located at each of the four corners of the camper framework.

As shown in FIGS. 1 and 4, the boat supporting framework may comprise a pair of elongated spaced structural elements 30 and 32 that may conveniently take the form of conventional C-shaped beams having spring assemblies 34 and 36 connected thereto, which spring assemblies are connected to axles 38 extending between each of the pairs of wheels. A plurality of boat support braces 40 and 42 may be connected to the longitudinal structural elements 30 and 32, respectively, and may be interconnected at the inner extremities thereof by welding, bolting or by any other suitable means of connection. The transverse boat support elements 40 and 42 may be disposed in depending angular relationship, thereby substantially conforming to the V-shaped configuration of the bottom of most pleasure boats, such as that shown in broken line at 44.

To facilitate movement of the boat 44 into and out of receiving relationship with the boat supporting framework during launching and retrieval operations, a plurality of roller assemblies, such as shown at 46, may be carried by the boat supporting structural elements 40 and 42 in such manner that the keel of the boat will engage the roller elements 46 and allow the boat to roll on the rollers into and out of boat transporting relationship with the trailer mechanism. A pair of lateral elongated boat support pads 48 and 50 may be supported, respectively, by the boat supporting structural elements 40 and 42. Each of the pads may include a plurality of depending support elements, such as shown at 52, having elongated adjustment openings 54 formed therein and receiving bolts for bolting connection of the pads relative to the transverse boat supporting elements. The boat supporting pads 48 and 50 may be appropriately adjusted to compensate for the differences in hull design of various boats that might be transported by the trailer mechanism.

The camper framework 24 may be defined by generally parallel side structural elements 56 that may be connected in any suitable manner to end structural elements 58. Intermediate structural elements 60 and 62, shown in broken line in FIG. 4 may be connected to the end structural element 58 in order to provide adequate support for the camper assembly 26 supported thereby As indicated above it will be desirable to raise and lower the camper framework 24 and the camper assembly 26 relative to the boat supporting framework 12 and such may be accomplished through utilization of any one of a number of suitable types of lift mechanisms including hydraulic lift mechanisms, such as shown in FIGS. 1, 4 and 5 or mechanical lift mechanisms such as illustrated in FIG. 11. One suitable hydrualic lift mechanism is shown in detail at FIG. 5 and may incorporate a base portion 64 that may be welded or otherwise secured to the longitudinal structural element 30. The base element 64 may be internally threaded and may receive the lower externally threaded portion 66 of an inner tubular element 68.

An outer tubular element 70 may receive the inner tubular element 68 in telescoping relation therein and may have the lower extremity thereof welded or otherwise secured to the camper framework 24. An upper externally threaded extremity 72 of the outer tubular element 70 may receive an internally threaded end closure element 74 having an aperture 76 formed centrally thereof that may have a piston shaft 78 extending therethrough. The piston shaft 78 may be provided with a stop element 80 which, if desired, may conveniently take the form of a nut that may be threadedly received in locked relation on the upper extremity of the piston shaft.

A fluid motor cylinder 82 may be disposed within the inner tubular element 82 and may have a quick connection portion 84 thereof connected through an aperture 86 in the base element 64 to the lower portion of the fluid motor cylinder. A piston 88 may be disposed within the fluid motor cylinder and may be connected to the lower extremity of the piston shaft 78, the piston shaft extending through an appropriate aperture 90 defined in the upper extremity of the fluid motor cylinder.

A fluid supply conduit 92 may be provided that may be connected to a suitable source of pressurized medium, such as hydraulic fluid, for example, and a quick disconnect fitting 94 may be secured to the extremity of the conduit 92 and may be received by the connector 84 to establish operative fluid communication between the conduit 92 and the fluid motor cylinder 82 below the piston 88. As hydraulic fluid is charged from the conduit 92 into the cylinder 82, the fluid will act upon the piston 88 and will urge the piston element upwardly and through the piston shaft connection with the upper end cap 74 of the outer tubular element 70, will drive the outer tubular element upwardly, thereby moving the camper framework 24 upwardly. To lower the camper framework, it is simply necessary to bleed hydraulic fluid from the cylinder 82 through the quick disconnect coupling and conduit 92 back to a reservoir for receiving the fluid.

Referring now to FIG. 7, a hydraulic system for energizing the plurality of fluid motors with which the boat and camper trailer mechanism may be provided it is shown schematically. A pump 96, that may be driven by a DC electric motor 98, may have a suction conduit 100 disposed in communication with a reservoir 102 of hydraulic fluid. A discharge conduit 104 of the pump 96 may supply pressurized hydraulic fluid through a safety device 106 to a manifold conduit 108. A plurality of individual linear motor supply conduits 110, 112, 114 and 116 communicate the manifold conduit 108 to the hydraulic cylinders 82.

The safety fluid control device 106 may include a quick disconnect mechanism enabling the conduit 104 to be simply disconnected from the manifold conduit 108 when it is desired to remove the camper and camper support framework from the trailer mechanism. Also included into the safety mechanism 106 may be one or more check valve mechanisms that effectively prevent bleeding of fluid from the individual conduits 110, 112, 114 and 116 and the manifold conduit 108 in the event the fluid supply conduit 104 should be ruptured for any reason whatever. The safety device 106 will allow an optimum flow of fluid therethrough for raising and lowering the camper and camper framework structures, but will not allow excessively rapid flow as might otherwise occur upon rupture of the hydraulic fluid supply conduit 104.

A fluid bleed control device 118 may interconnect the conduit 104 with the reservoir 102 and may be selectively operated, as desired, to allow controlled bleeding of hydraulic fluid from the manifold conduit 108 through the safety device 106, thereby allowing the fluid motors 82 to be bled down slowly to allow slow and controlled descent of the camper and camper framework assemblies. Hydraulic fluid pressure in the conduit 104 may be controlled by means of a pressure responsive valve 120 that may be received by a conduit 122 interconnecting the conduit 104 with the return conduit 124 discharging fluid into the reservoir 102. In other words, the pump 96 energized by the motor 98 will build up hydraulic pressure to a predetermined acceptable level and thereafter the check valve 120 will open responsive to excessive pressure accomplishing bleeding of hydraulic fluid from the conduit 104 into the conduit 124 and to the reservoir 102. The supply of hydraulic pressure through the safety device 106 and to the manifold conduit 108 will always remain at an acceptable level.

When the camper framework and the camper assembly are elevated, in the manner illustrated in FIG. 4, for transportation thereof on a roadway, sudden lateral thrust loads may be applied to the various fluid motor mechanisms as a vehicle towing the trailer accelerates or brakes during normal roadway operation. To prevent excessive lateral loads from being applied to the fluid motors, it may be desirable to provide means to brace the structure against the effects of lateral loads. A brace mechanism, such as illustrated in FIG. 6, may be employed, which incorporates inner and outer telescopically related tubular elements 126 and 128 that may be adjustably related in any suitable manner. As shown in FIG. 6, adjustment apertures 130 may be formed in the inner tubular element 126 and may be aligned with adjustment apertures formed in the outer tubular element. A retainer pin 132 may be received within appropriate aligned ones of the apertures, thereby locking the inner and outer tubular elements into a particular adjusted relationship. The inner tubular element 126 may be secured by a pivot 134 to a projection 136 welded or otherwise secured to the outer tubular elements 70. The outer tubular portion 128 of the brace may be connected by a pivot 138 to a projection 140 that is welded or otherwise secured to the upper portion of the longitudinal structural element 30.

When the camper and camper framework assemblies are to be raised or lowered relative to the boat supporting framework, the pin 132 may be removed from the aligned apertures in the brace, thereby allowing the brace to be free for telescoping movement. The fluid motor mechanisms are then energized through operation of the pump 96, thereby causing the camper framework and camper assembly to be moved upwardly or downwardly relative to the boat supporting framework. After the camper and camper framework have been properly positioned, the pin 132 may be placed within appropriate aligned apertures of the inner and outer tubular elements 126 and 128. It may be desirable to provide a threaded brace device that may be infinitely rather than incrementally adjustable, as desired, it only being necessary that a brace be provided that will absorb transverse thrust loads applied to the camper and camper framework assemblies as the vehicle is operated and which will facilitate relative movement between the camper and trailer. For example, as the vehicle is moving forward and the brakes of the vehicle are applied, the camper and camper framework will tend to shift forward relative to the boat supporting framework of the trailer. The brace structure including the tubular elements 126 and 128 will resist such forward movement and will prevent the hydraulic cylinders from being overstressed by lateral loads.

When it is desired to transport only the camper mechanism on the trailer assembly, the longitudinal structural elements 30 and 32 will extend rearwardly beyond the camper mechanism. A platform 142 may be received between the longitudinal structural elements and may provide a support for transporting articles, such as storage compartments for camper gear, motorcycles, and the like. The camper assembly then will remain substantially free of stored equipment and may be utilized effectively for habitation at camping sites.

After the trailer and camper assemblies have been moved to a camping site, it is simply necessary to raise the upper portion of the camper in order to make it suitable for habitation.

If a boat is in assembly with the boat supporting framework of the trailer mechanism and a boating and camping trip is undertaken, it is simply necessary to position the camper as near as practical to the upper extremity of the boat without actually touching the boat. In this manner, the center of gravity of the camper may be lowered as much as possible, thereby lowering the overall center of gravity of the combination boat, camper and trailer mechanism. If it is desired to stop for an overnight rest before reaching a facility where the boat may be launched and utilized, it is not necessary to remove the boat from the trailer assembly before the camper mechanism can be utilized. Under these conditions it is simply appropriate to raise the upper portion of the camper to make it habitable, as shown in FIG. 3, while the rigid lower portion of the camper remains in elevated position above the trailer mechanism and boat as shown in FIGS. 1 and 4. It has been determined that the lower portion of the rigid framework of the camper may be positioned a mere four feet above the ground level with a boat in proper transporting position on the trailer mechanism. Access to the camper assembly may be gained through use of a short ladder.

It may be desirable to remove the camper from the combination boat and camper trailer mechanism and to travel solely with the boat and trailer. In order to accomplish removal of the camper from the trailer mechanism, reference may be had to FIG. 4, wherein the trailer framework is provided with a pair of longitudinal guide channels defined by structural elements 144 and 146 that may be secured by welding or by any other suitable means of connection to the longitudinal support elements 30 and 32, respectively. Support roller assemblies 148 and 150 may be received within appropriate apertures formed through the camper supporting framework and may depend below the camper framework of the trailer mechanism.

With the boat 44 removed from the trailer mechanism, the hydraulic fluid may be bled from the fluid motors, thereby allowing the camper to descend into receiving relationship with the boat supporting framework of the trailer mechanism. The rollers 148 and 150 will be received, respectively, within the guide channels defined by the structural element 144 and 146. After this has occurred, the upper end cap 74 of the outer tubular element 70 may be removed and the hydraulic cylinders within the inner tubular elements may be removed through the outer tubular element after being disconnected by the quick disconnect mechanism provided therefore. After this has been done, the inner tubular element 68 may be unthreaded from the base element 64 thereby completely separating the fluid motor devices from the boat supporting framework of the trailer mechanism. After such releasing operations have been accomplished, the camper framework and camper assembly may be simply moved or rolled along the guideway defined by the structural elements 144 and 146, thereby separating the camper assembly from the trailer mechanism. The hydraulic fluid motors may be partially disassembled and disconnected quite easily and simply from the boat supporting framework of the trailer mechanism within a few minutes time requiring no special tools other than common automotive wrenches. Moreover, such fluid motor disassembly operations may be effectively accomplished in a few minutes time if it is necessary or desirable to replace one of the hydraulic cylinders.

As the camper framework and camper assemblies are raised and lowered relative to the boat supporting framework of the trailer mechanism, it will be appropriate to provide a guiding function to insure proper guiding of the camper and camper framework assemblies. It will also be desirable to provide means for positively locating the camper assemblies at the upper most position thereof. In accordance with the present invention, a plurality of vertical guide elements 152 and 154 may be secured to the longitudinal support elements 30 and 32 of the boat supporting framework by means of bolts 156 or by any other suitable means of connection. Tubular guide elements 158 and 160, connected to the camper support framework 24, may be received by the verticle guide elements 152 and 154, respectively, thereby providing a guiding function. Stop elements 162 and 164 may be adjustably fixed to the guide elements 152 and 154, respectively, and may be engaged by the tubular guide elements 158 and 160 as the camper assembly and camper framework structures reach the proper elevated position thereof. After the elevated position has been reached, locking pins 166 and 168 may be positioned in appropriate apertures formed in the guide elements 152 and 154, thereby positively preventing the camper framework from descending below the level of the pins even if the hydraulic system should fail for any reason whatever. It will be practical to lock the lift mechanisms while the camper assembly is in its elevated position relative to the boat supporting framework of the trailer mechanism.

In view of the fact that the camper assembly and camper framework are disposed above the boat and the lift mechanisms are interposed between the boat supporting framework and the camper framework, it may be difficult for the boat to be launched manually from the trailer if some force is necessary to move it rearwardly relative to the trailer mechanism. Accordingly, it is desirable that a power actuated boat launching mechanism be provided and according to the present invention, such boat launching mechanism may conveniently take the form illustrated schematically or diagrammatically in FIGS. 8 and 9. As shown in FIG. 8 a pair of grooved rollers 170 and 172 may be attached to the rear portion of the boat supporting framework and a boat launching loop 174, which may conveniently take the form of a cable chain rope or other acceptable device, may be looped about the rollers 170 and 172 and may be connected to the front portion of the boat at 176. A structural ring 178 may be connected into the boat launching loop 174 and may receive a connecting hook device 180 that may be connected to a winch cable 182 extending from a DC motor energized winch mechanism 184.

When it is desired to launch the boat from the trailer mechanism, the trailer may be backed into launching position relative to a body of water and, after disconnecting conventional retaining safety devices that insure retention of the boat in assembly with the trailer, the winch mechanism 184 may be energized, thereby causing the winch cable 182 to be taken up by the winch. When this occurs the boat launching loop will be pulled about the rollers 170 and 172 and the loop 174 will assume the configuration illustrated in Fig. 9. As the cable 182 is taken up by the winch mechanism the forward end of the loop 174 and the boat will be moved rearwardly relatively to the trailer mechanism, thereby causing the boat to be forcibly launched from the trailer into the body of water.

When it is desired to retrieve the boat onto the trailer mechanism, the connecting hook 180 may be released from the connecting ring 178 of the loop 174 and may be simply connected to the forward retrieving eye 186 of the boat and the cable 182 may again be taken up by the winch mechanism 184, thereby causing the boat to be pulled onto the trailer mechanism.

It may be desirable to provide separate winch mechanisms for launching and retrieving the boat from the trailer mechanism. According to the present invention, a double drum winch may be employed, the separate drums of the winch being selectively energized by a suitable gear mechanism interconnected between the winch drums and the DC electric motor of the winch mechanism. A boat launching loop 188, such as illustrated at 174 in FIG. 9, may be connected by a winch cable 190 to the lower drum 192 of the double drum winch mechanism. When it is desired to launch the boat, the lower drum 192 may be energized, thereby taking up the cable 190 and causing the loop 188 to function in the same manner as illustrated and discussed above in connection with FIGS. 8 and 9.

When it is desired to retrieve the boat in assembly with the trailer mechanism, the upper winch drum 194 may be energized, thereby taking up a boat retrieving cable 196 that may be connected through suitable connection means to the forward retrieving eye 186 of the boat.

Upon launching of the boat from the trailer mechanism it is necessary to prevent the boat from pivoting relative to the trailer mechanism and causing the forward portion of the boat to move upwardly from the boat supporting framework of the trailer into interfering relationship with the camper assembly disposed thereabove. Accordingly, one suitable means for maintaining the keel of the boat into contacting relation with the boat support pads and rollers carried by the boat supporting framework of the trailer mechanism, the framework may include a rearwardly adjustable section, such as illustrated generally at 200 in FIG. 10. The adjustable section may include a transverse structural element 202 comprised of angularly related structural members 204 and 206 that may be joined at 208 by welding or by any other suitable means of connection.

The transverse structural element 202 may be welded or otherwise fixed to a pair of longitudinal structural elements 210 and 212 that may be received in telescoping relation with the structural elements 30 and 32 of the trailer framework. Locking pins 214 and 216 may extend through aligned apertures formed in the structural elements 30, 32, 210 and 212 thereby securing the movable telescoping framework portion 200 relative to the boat supporting framework.

The structural elements 210 and 212 may have a plurality of spaced apertures formed therein for alignment with the apertures formed in the structural elements 30 and 32, thereby allowing the framework portion 200 to be locked in various extended positions relative to the boat supporting framework. The framework section 200 may be extended rearwardly relative to the boat supporting framework in order to provide additional structural support for the boat as it is launched from the rear portion of the trailer.

It may be desirable to provide mechanical jack devices for raising the camper assembly and camper framework relative to the boat supporting framework of the trailer mechanism. Accordingly, as shown in FIG. 11, mechanical jack devices such as generally shown at 218 may be employed that may be actuated by rotation of a hand crank 220 that, through conventional gearing, achieves rotation of a captured drive nut relative to a threaded jack shaft 222. The jack devices may be actuated individually for raising and lowering the camper assembly.

With the camper assembly elevated as shown in FIG. 1, after the boat has been launched from the trailer, it will be desirable to lower the camper assembly to the position illustrated in FIG. 2 and to raise the upper portion of the camper assembly to the position illustrated in FIG. 3. According to the present invention, manipulation of the upper portion of the camper assembly may be effectively accomplished by a plurality of elongated cover supporting rods 225 and 227 that may be received within the tubular guide rods 152 and 154 and may extend into receiving relationship with a plurality of camper cover support connector elements 229 and 231. After the cover supporting rods have been so placed, the camper cover will be unlatched from the body portion of the camper and the body portion of the camper assembly will be lowered onto the boat supporting framework. When this occurs, the cover portion of the camper assembly will remain stationary, being supported by the rods 225 and 227. This movement will accomplish partial erection of the camper assembly and the cover may then be moved further upwardly simply by manual manipulation of the spring urged camper cover elevating devices 233 and 235.

It may also be desirable to provide a plurality of mechanical jack mechanisms that may be simultaneously actuated by rotation of a single gear operator mechanism that imparts rotary motion to captured drive nuts of a plurality of jack mechanisms. Alternatively, a plurality of motor operated mechanical lift devices may be employed as desired and may be responsive to actuation of a single electric control circuit for raising and lowering a camper assembly relative to the best supporting framework of a trailer.

In view of the foregoing, it is apparent that I have provided a novel combination boat and camper trailer mechanism and wherein a camper, carried by the trailer, may be utilized both in raised or lowered positions as desired. A boat, may be carried beneath the camper and the boat may be of sustantial size and weight without in any way interfering with use or operation of the camper mechanism. The boat may be launched from the rear portion of the trailer mechanism without pivoting relative thereto during launching and without allowing the forward end of the boat to raise and interfere with the camper during both launching and boat retrieving operations. When the boat is removed from the trailer mechanism, the camper and camper framework may be lowered onto the boat supporting framework thereby allowing the camper assembly to be utilized in its lowered position. The unique boat and camper supporting framework of the present invention effectively facilitate adjustable maintenance of the center of gravity as low as possible during roadway towing operations.

In the event it is desired to utilize the trailer mechanism solely for support of the boat, the camper may be simply and efficiently removed from the boat by disconnecting the lift mechanisms that establish connection between the boat supporting framework and the framework of the camper. The camper may be rolled from the trailer by a plurality of rollers that are supported on the camper and engage guideways defined on the boat supporting framework.

During boat launching operations, means may be provided for forcibly launching and retrieving the boat relative to the boat supporting framework, thereby effectively eliminating any necessity for manual forces to be applied to the boat during launching or retrieval operations.

It is apparent, therefore, that I have provided a novel combination and boat camper trailer mechanism that accomplishes all of the objects hereinabove set forth, together with other objects and advantages that will become apparent upon a thorough understanding of the apparatus itself.

Numerous variations and modifications may obviously be made in the structures herein described without departing from the spirit and scope of the present invention. Accordingly it should be clearly understood that the form of the invention described herein and shown in the figures of the accompanying drawings is illustrative only and is not intended to limit the scope of the present invention.

I claim:

1. A boat and camper transporting mechanism, comprising:
    a trailer having a boat supporting framework and being adapted for launching of a boat into a body of water from the rear of the trailer, said trailer framework being positioned relative to the axles of the trailer wheels such that pivoting of a boat relative to the trailer framework is prevented during boat launching and retrieval operations;
    a camper supporting framework being carried by said boat supporting framework;
    a plurality of jack mechanisms being disposed one at each corner of said camper framework, said jack mechanisms each having a movable portion and a stationary portion, one of said movable and stationary portions being fixed to said camper framework and the other of said movable and stationary portions being fixed to said boat supporting framework, relative movement of said movable and stationary portions of said jack mechanisms raising and lowering said camper framework relative to said boat supporting framework;
    means causing selective relative movement of said movable and stationary portions of said jack mechanisms; and
    a camper assembly being carried by said camper supporting framework, said camper assembly comprising a generally rigid body portion and having a cover portion that is elevatable relative to said body portion to render said camper assembly habitable, said camper supporting framework and camper assembly being positioned above said boat supporting framework by said jack mechanisms when a boat is to be located on said boat supporting framework said camper assembly and camper framework being positioned by said jack mechanisms in spaced relation above the boat for roadway traveling and being positioned in supported relation on said boat supported framework when a boat is not positioned on said boat supporting framework, said camper assembly being habitable in the raised and lowered positions thereof.

2. A boat and camper transporting mechanism as recited in claim 1. including:
    means locking said camper framework in the raised condition thereof and supporting said supporting framework and said camper assembly independent of said jack mechanisms 3. A boat and camper transporting mechanism as recited in claim 1, wherein said jack mechanisms each comprise:
    inner and outer tubular elements being disposed in telescoping relation, said inner tubular element being secured to said trailer framework and said outer tubular element being secured to said camper framework;

closure means closing opposed extremities of said inner and outer tubular elements;

a linear hydraulic motors being disposed within each of said inner and outer telescoping tubular elements, said stationary portion being a hydraulic cylinder and said movable portion being a piston assembly telescopically received by said hydraulic cylinder, said piston assembly being connected to the closure means of said outer tubular element; and said means causing selective relative movement of said stationary and movable portions of each of said plurality of hydraulic motors being a hydraulic fluid supply system being selectively controllable for controlling movement of said piston assembly relative to said hydraulic cylinder.

4. A boat and camper transporting mechanism as recited in claim 1, wherein:

each of said jack mechanisms are linear hydraulic motor devices having a stationary portion and a movable portion, one being disposed at each corner of said camper framework, said movable portions of said linear hydraulic motor devices being connected to said camper framework and said stationary portions of said motor devices being connected to said boat support framework, said movable portions of said motor devices being moved relative to said stationary portions for raising and lowering said camper framework relative to the boat supporting framework.

5. A boat and camper transporting mechanism as recited in claim 1, wherein each of said jack mechanisms for raising and lowering said camper framework comprises a hydraulic motor assembly, said stationary portion being secured to said camper framework and said movable portion being secured to said boat supporting framework, said movable portion being extended and retracted relative to said stationary portion for imparting vertical movement to said camper framework and said camper assembly relative to said boat supporting framework; and a controllably hydraulic fluid supply system for selectively imparting extension and retraction movement to said movable portion of said jack mechanism.

6. A boat and camper transporting mechanism as recited in claim 1, wherein:

locking means is provided for supporting said camper framework at a position elevated above said boat supporting framework independent of said jack mechanisms.

7. A boat and camper transporting mechanism as recited in claim 1, wherein each of said fluid motor means comprises;

first and second tubular members being disposed in telescoping relation, one of said tubular members being connected to said boat supporting framework and the other of said tubular members being connected to said camper supporting framework; and linear fluid motor means being disposed within one of said tubular elements and having an operating piston shaft operatively connected to the opposite tubular element, said linear fluid motor, upon being energized, imparting telescoping movement to said first and second tubular elements and thereby achieving relative movement between said boat supporting framework and said camper supporting framework.

8. A boat and camper transporting mechanism as recited in claim 7, wherein each of said fluid motor means includes;

locking means for locking said fluid motor means at selected positions thereof.

9. A boat and camper transporting mechanism adapted to be towed behind a vehicle, said mechanism comprising:

a wheeled trailer having a boat supporting framework and being adapted for launching of a boat into a body of water from the rear portion of the trailer, said boat supporting framework being positioned relative to the axles of the trailer such that a boat may be launched from the trailer into a body of water and retrieved from the body of water without pivoting relative to the boat supporting framework during launching and retrieval operations;

a camper supporting framework being disposed above said boat supporting framework;

a plurality of jack mechanisms being disposed one at each corner of said camper framework, said jack mechanisms each having a movable portion and a stationary portion, one of said movable and stationary portions being fixed to said camper framework and the other of said movable and stationary portions being connected to said boat supporting framework, relative movement of said movable and stationary portions of said jack mechanisms raising and lowering said camper framework relative to said boat supporting framework;

means causing selective relative movement of said movable and stationary portions of said jack mechanisms; and a camper assembly being carried by said camper supporting framework, said camper assembly comprising a generally rigid body portion and having a cover portion that is elevatable relative to said body portion to render said camper assembly habitable, said camper assembly being habitable both in the raised and lowered positions thereof, when a boat is located on said boat supporting framework, said camper assembly and camper framework being positioned by said jack mechanisms in spaced relation above the boat for roadway traveling and being positionable in supported relation on said boat supporting framework when a boat is not positioned on said boat supporting framework 10. A boat and camper transporting mechanism as recited in claim 9, including;

means for supporting said camper supporting framework and said camper assembly in the raised positions thereof independent of said jack mechanisms.

11. A boat and camper transporting mechanism as recited in claim 10 including:

locking means locking said camper framework and said camper assembly in selected elevated positions thereof, said locking means supporting said camper framework and camper assembly exclusive of said jack mechanisms.

12. A boat and camper transporting mechanism as recited in claim 9 including:

means for supporting said cover portion of said camper assembly relative to the boat supporting framework of said trailer and accomplishing at least partial erection of said camper assembly during lowering of said body portion of said camper assembly relative to said boat supporting framework.

13. A boat transporting mechanism as recited in claim 12 wherein said means for supporting said cover portion of said camper assembly comprises:
cover support connector means being provided on said camper cover; and
cover support means being removably disposed in fixed relation to said boat supporting framework of said trailer and engaging said cover support connector means and supporting said camper cover relative to said boat supporting framework as said body portion of said camper assembly is lowered toward said boat supporting framework.

14. A boat and camper transporting mechanism adapted to be towed behind a vehicle, said mechanism comprising:
at least one trailer axle means having a pair of wheels disposed one at each extremity thereof;
a pair of generally parallel longitudinal structural elements being disposed above said axle means and being disposed in substantially normal relation with said axle means;
spring means being connected to said axle means and being interposed between said longitudinal structural elements and said axle means and supporting said structural elements in movable cushioned relation with said structural elements;
boat supporting means being connected between said longitudinal structural elements and cooperating with said longitudinal structural elements to define a boat supporting framework, said boat supporting means extending below the level of said longitudinal structural elements and providing non-pivoting boat launching and retrieval operations;
a camper supporting framework being disposed above said boat supporting framework, and a camper assembly being carried by said camper supporting framework;
a plurality of jack mechanisms being disposed one at each corner of said camper framework, said jack mechanisms each having a movable portion and a stationary portion, one of said movable and stationary portions being fixed to said camper framework and the other of said movable and stationary portions being connected to said boat supporting framework, relative movement of said movable and stationary portions of said jack mechanisms raising and lowering said camper framework relative to said boat supporting framework and, when a boat is located on said boat supporting framework, said jack mechanisms position said camper assembly and camper framework in spaced relation above the boat for roadway traveling;
means causing selective relative movement of said movable and stationary portions of said jack mechanisms; and
said camper assembly comprising a generally rigid body portion and having a cover portion that is elevatable relative to said body portion to render said camper assembly habitable, said camper assembly being raised and lowered relative to said boat supporting framework along with said camper framework and being habitable in both the raised and lowered positions thereof.

15. A boat and camper transporting mechanism as recited in claim 14, wherein said boat supporting means comprises:
a plurality of transverse boat supporting elements being connected at the extremities thereof to said longitudinal structural elements, said central portion of said boat supporting elements being disposed below the level of said longitudinal structural elements.

16. A boat and camper transporting mechanism as recited in claim 15, wherein:
said plurality of transverse boat supporting elements are of generally V-shaped configuration.

17. A boat and camper transporting mechanism as recited in claim 15, including:
boat supporting and launching means being connected to said boat supporting elements and being disposed for engagement with a boat positioned within said trailer mechanism.

* * * * *